United States Patent [19]
Aydt et al.

[11] Patent Number: 5,669,656
[45] Date of Patent: Sep. 23, 1997

[54] FOLDING TOP FOR VEHICLES, PARTICULARLY PASSENGER CARS

[75] Inventors: Matthias Aydt, Eberdingen; Kurt Pfertner, Wimsheim; Alexander Zeissner, Illingen; Peter Thomas, Pforzheim; Christof Blech, Renningen, all of Germany

[73] Assignee: Dr. Ing. h.c.F. Porsche AG, Weissach, Germany

[21] Appl. No.: 561,969

[22] Filed: Nov. 22, 1995

[30] Foreign Application Priority Data

Nov. 23, 1994 [DE] Germany ............ 44 41 671.7

[51] Int. Cl.⁶ ............................................. B60J 7/12
[52] U.S. Cl. ....................... 296/116; 291/135; 291/213
[58] Field of Search ............................ 296/107, 135, 296/213, 116

[56] References Cited

U.S. PATENT DOCUMENTS

| | | |
|---|---|---|
| 2,524,171 | 10/1950 | Karsted . |
| 2,572,592 | 10/1951 | Brandt et al. ............ 296/107 |
| 3,653,711 | 4/1972 | De Claire et al. ........ 296/135 |
| 5,311,702 | 5/1994 | Moore ..................... 296/135 |

FOREIGN PATENT DOCUMENTS

| | | |
|---|---|---|
| A1000773 | 2/1952 | France . |
| 0509326A1 | 10/1992 | Germany . |
| 4234811A1 | 4/1994 | Germany . |
| 62-279174 | 12/1987 | Japan .............. 296/213 |

Primary Examiner—Gary C. Hoge
Attorney, Agent, or Firm—Evenson McKeown Edwards & Lenahan, PLLC

[57] ABSTRACT

A folding top for vehicles, particularly passenger cars, is composed of a folding top structure and a folding top covering, the folding top covering and sealing strips being held in position on lateral frame parts of the folding top structure. So that, in the case of a folding top, the mounting expenditures for changing the folding top covering are reduced and, on the other hand, the surrounding noises in the driving operation which occur at the lateral frame parts are minimized, it is provided that the linkages for the folding top covering and for the sealing strips are provided separately and spaced away from one another on the lateral frame parts. Wall sections of the lateral frame parts extend between the two spaced linkages and are not covered by the folding top covering and form the shell of the vehicle body. The end area of the wall sections facing the folding top covering is constructed such that, together with the adjoining folding top covering, it forms a rain groove.

27 Claims, 2 Drawing Sheets

FOLDING TOP FOR VEHICLES, PARTICULARLY PASSENGER CARS

BACKGROUND AND SUMMARY OF THE INVENTION

This invention relates to a folding top for vehicles, particularly passenger cars, composed of a folding top structure and of a folding top covering, the folding top covering and sealing strips being held in position on lateral frame parts of the folding top structure.

From European Patent Document EP 0 509 326 A1, a folding top for vehicles is known which is composed of a folding top structure and a folding top covering.

The folding top covering extends around laterally exterior, longitudinally directed frame parts of the folding top structure, the marginal edges of the folding top cover being connected with moldings and being fastened on the underside of the frame parts. At the same time, a holding rail is screwed on in this area which accommodates a sealing strip.

In the connection area between the folding top covering and the moldings, a bordering strip or a weatherstrip is arranged between the folding top covering and the moldings for constructing a rain groove.

This arrangement has the disadvantage that the exchange of the folding top covering requires relatively high expenditures with respect to time and mounting because the sealing strips as well as the screwed-on holding rails must be removed from the frame part and must then be mounted again. In addition, during the driving operation, laterally projecting rain grooves cause relatively high surrounding noises.

It is an object of the invention to take such measures on a folding top that, on the one hand, the mounting expenditures are reduced for changing the folding top covering and that, on the other hand, the surrounding noises during the driving operation are reduced.

According to the invention, this object is achieved by providing an arrangement wherein linkages for the folding top covering and for the sealing strips are provided separately from one another on the lateral frame parts of the folding top structure, wherein sections of the lateral frame parts of the folding top structure, which are not covered by the folding top cover and which form the vehicle shell in sections, extend between the spaced linkages, and wherein a nose-shaped partial area of the wail section forming the vehicle shell which faces the folding top covering is constructed such that, together with the adjoining folding top covering situated farther on the inside, a rain groove is formed.

Principal advantages achieved by means of the invention are that, because of the spatial separation of the fastenings for the folding top covering and the sealing strips, the exchange of a damaged folding top covering is significantly facilitated because only the sealing strips must be removed from the holding rails. On the other hand, the holding rails may remain mounted on the lateral frame parts.

The fastening screws for the folding top covering are accessible from below through recesses of the holding rail.

The wall section of the lateral frame parts which is constructed between the two fastenings, projects toward the exterior side of the vehicle and forms the vehicle body shell representing a special styling characteristic or a styling edge and furthermore ensures a defined transition between the folding top covering and the lateral frame parts.

The nose-shaped partial areas of the projecting wall sections, together with the folding top covering, form a rain groove. Since this rain groove is integrated into the lateral frame part and is not built up as previously away from the frame part toward the outside, the surrounding noises during the driving operation are clearly reduced because the lateral distance between the rain groove and the adjoining window is clearly reduced.

On the side of the frame parts facing the adjoining window, the sealing strips are held in position in a first indented receiving device by means of a screwed-on holding rail.

The folding top covering can be fixed on a second receiving device open in the direction of the exterior side of the vehicle by means of a profiled holding strip, in which case the folding top covering is suspended on the free end of an inwardly bent leg of the holding strip. The holding strip is screwed to the frame part. The forward frame part which adjoins the windshield frame is constructed in one piece with a relatively large-surface forward folding top section.

The rearward lateral frame part of the folding top structure is formed by a bent B-column.

Other objects, advantages and novel features of the present invention will become apparent from the following detailed description of the invention when considered in conjunction with the accompanying drawings.

DETAILED DESCRIPTION OF THE DRAWINGS

Figure 1:
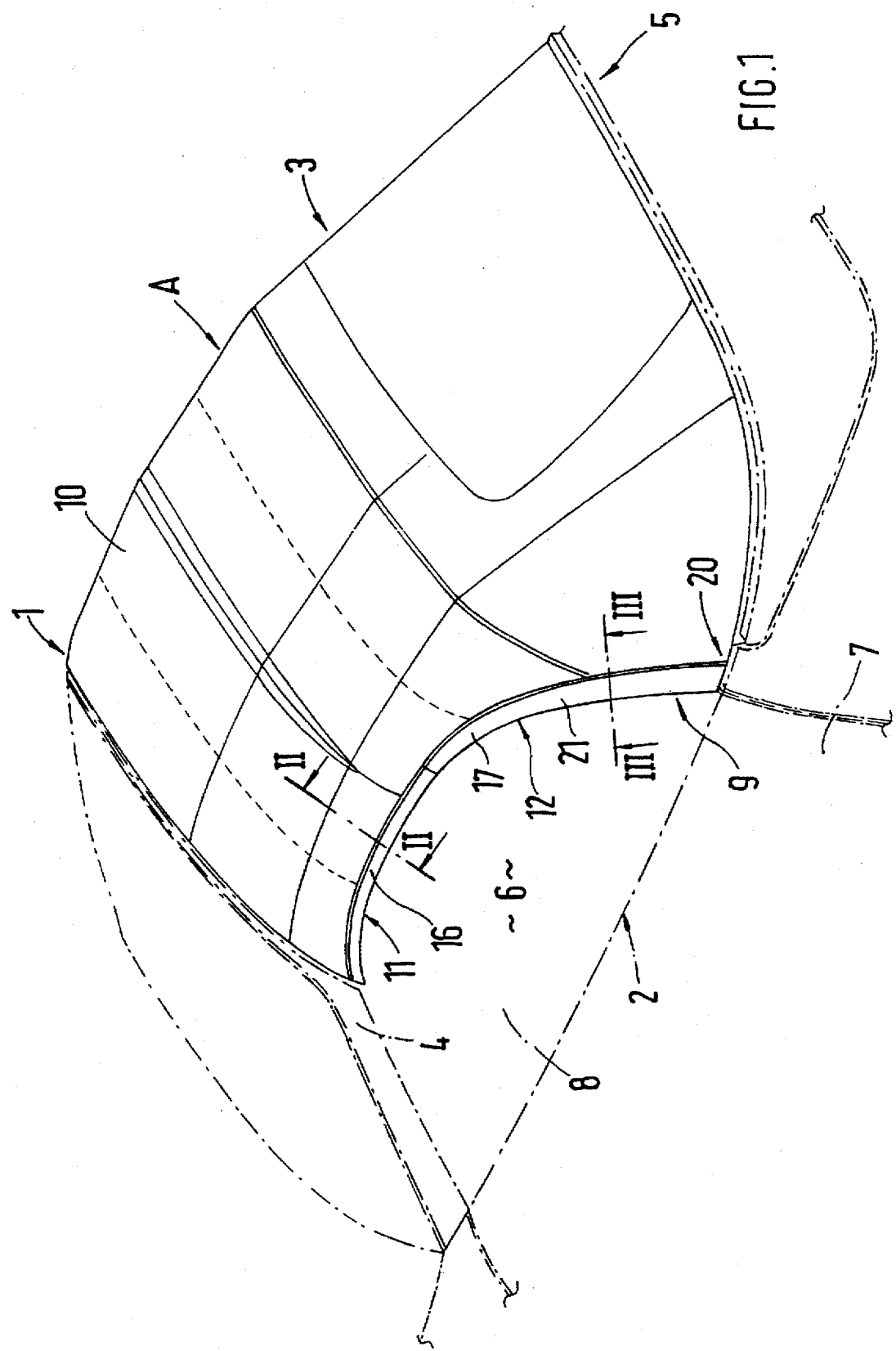
FIG. 1 is a perspective partial view diagonally from the rear of a passenger car having a folding top, constructed according to a preferred embodiment of the invention.

Above a belt line 2, a passenger car 1 has a folding top 3 which extends in a closed position A from a windshield frame 4 to a rear area 5 and covers a passenger compartment 6 in the upward direction. The passenger compartment 6 is accessible through side doors 7, a vertically adjustable window 8 of the doors 7 being constructed above the belt line 2 without a frame.

The folding top 3 can be moved from the closed position A into a folded-together, rear-side deposited position, which is not shown in detail, and vice versa. In the deposited position, the folded-together folding top rests flatly on the rearward area 5 or is housed in a folding top compartment which is not shown in detail.

The folding top 3 is composed of a supporting folding top structure 9 and a folding top covering 10, in which case the folding top covering 10 and sealing strips 13 are held in position on laterally exterior, longitudinally extending frame parts 11, 12 of the folding top structure 9.

According to the invention, the linkages 14, 15 for the folding top covering 10 and the sealing strips 13 are provided spatially separately from one another on the lateral frame parts 11, 12. Wall sections 16, 17, which in sections form the shell of the vehicle body, are constructed on the frame parts 11, 12 between the linkage areas and project in the direction of the exterior side B of the vehicle. Nose-shaped partial areas 18 of these wall sections 16, 17, together with the folding top covering 10, form a rain groove 19. The projecting wall sections 16, 17 on the lateral frame parts 11, 12 extend along the longitudinal sides of the vehicle continuously from the windshield frame 4 to an area 20 situated behind the side doors 7 approximately at the level of the belt line 2.

The projecting wall sections 16, 17, which represent a defined styling characteristic, form a type of molding or styling edge which widens continuously from the windshield frame 4 toward the rear and downward.

In the embodiment shown, the folding top structure 9 comprises two adjoining frame parts 11, 12 which are connected with one another in a hinged manner. The forward frame part 11 which is adjacent to the windshield frame 4 is advantageously constructed in one piece with a relatively large-surface, transversely extending forward folding top section which is not shown in detail and which is constructed to be rigid and carries the folding top covering 10 disposed above it.

The rearward frame part 12 is formed by a B-column 21 which is curved in the lateral view and whose lower end is pivotably disposed on a vehicle-body-side folding top bearing which is not shown in detail.

The forward folding top section with the integrated forward frame part 11 and the B-column 21 are preferably formed by diecast parts made of an aluminum or magnesium alloy.

The folding top structure 9 may also comprise more than two frame parts which are joined together in the longitudinal direction according to other non-illustrated embodiments of the invention.

An indented first receiving device or recess 22 is constructed on the two frame parts 11, 12 on the side facing the adjoining window 8, on which receiving device 22 the sealing strip 13 is fastened by means of a holding rail 23. In the cross-sectional view, the first receiving device 22 has an approximately U-shaped or V-shaped profile, in which case an exterior leg 24 is formed in sections by the projecting wall section 16.

At the base of the receiving device 22, the holding rail 23 is mounted which is profiled in a C-shape.

The holding rail 23 is fastened on the frame part 11 by locally arranged fastening screws 25.

Figure 2:
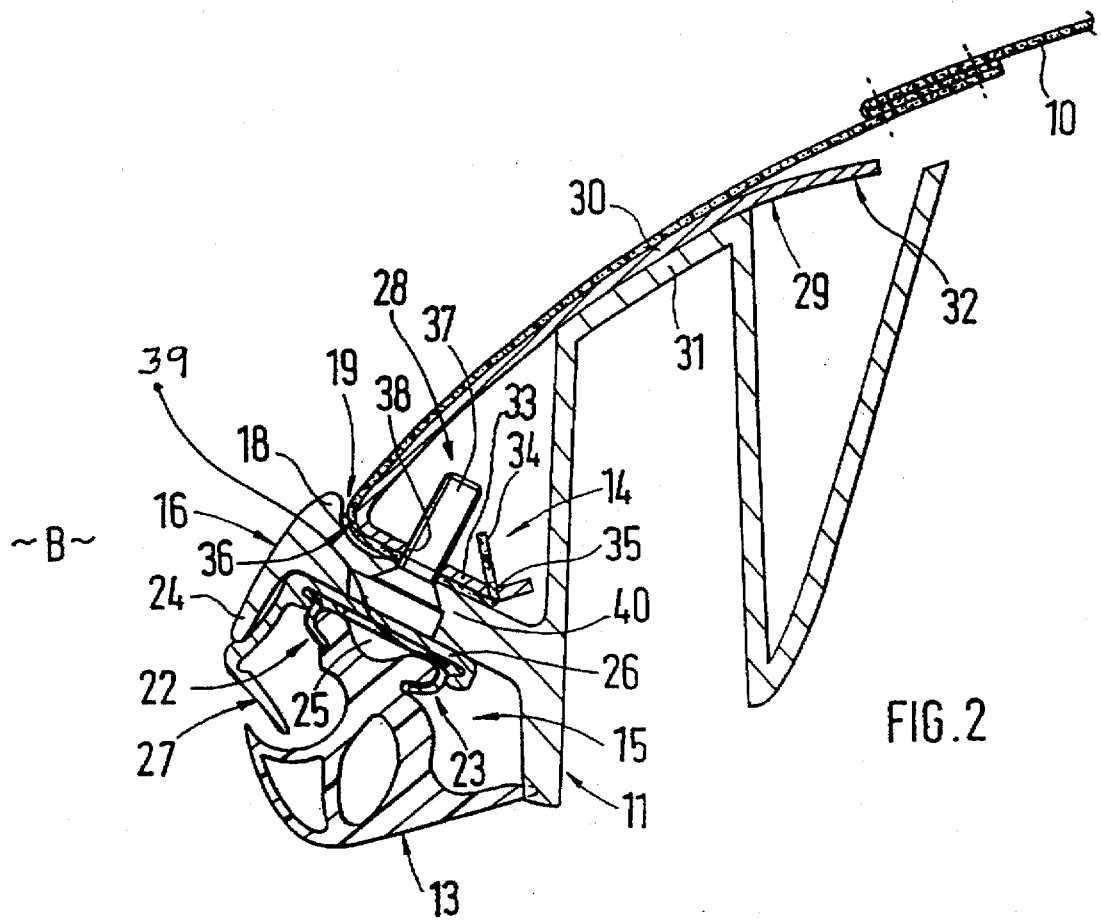
FIG. 2 is an enlarged sectional view taken along Line II—II of FIG. 1.

According to FIG. 2, the holding rail 23 is connected with a molding 26 made of rubber or plastic which rests in sections on the base of the receiving device and on the interior side of the wall section 16. A lip section 27 of the molding 26 is bent in the direction of the sealing strip 13.

On the side facing away from the first receiving device 22, a second, approximately triangular receiving device or recess 28 is provided on the forward lateral frame part 11, on which receiving device 28 the folding top covering 10 can be fixed. The second receiving device 28, which follows the projecting wall section 16, is constructed to be open in the direction of the exterior side of the vehicle.

The folding top covering 10 covers only a partial area of the forward frame part 11. In the fastening area of the folding top covering 10, an interior profiled holding rail 29 is provided which carries the folding top covering 10 and which is held in position on the frame part 11 by means of fastening screws 37.

The profiled holding strip 29 has a first, elongated, upwardly extending leg 30 which determines the desired outer contour of the lateral folding top covering 10.

The first leg 30 extends away from the upper edge of the projecting wall section 16 and extends approximately in parallel and as a continuation of the projecting wall section 16. According to FIG. 2, the first leg closes the side of the second receiving device 28 which is open in the direction of the exterior side of the vehicle and rests on an adjacent contact surface 31 of the forward, dimensionally stable folding top section.

The upper free end 32 of the first leg 30 is bent inwardly from the folding top covering 10. The lower end of the first leg 30 of the holding strip 29 is followed by an inwardly directed second leg 33 on which the folding top covering 10 is suspended on the end side.

On the interior end area of the second leg 33, locally projecting tongues 34 are constructed which are guided through slot openings 35 of the folding top covering 10. Individual longer tongues 34 can be bent into a holding position fixing the folding top covering 10. The two legs 30, 33 of the holding strip 29 are connected with one another by means of a radius-shaped transition area 36. By means of a double-sided adhesive tape, which is not shown in detail, the folding top covering 10 can be prefixed on the holding strip 29 before the tongues 35 are guided through the slot openings 35.

For fastening the holding strip 29, fastening screws 37 are provided which are guided from the underside of the frame part 11 through openings and are screwed into threaded bores 38 of the holding strip 29. The threaded bores 38 may be formed, for example, by means of extruded holes on the second leg 33 of the holding strip 29.

In the area of the fastening points for the holding strip 29 fixing the folding top covering 10, recesses 39 are provided locally on the holding rail 23 disposed below it.

The fastening screws 25 for the holding rail 23 are disposed offset from the fastening screws 37 for the holding rail 29 along the length of the frame part 11.

Between the receiving devices 22, 28 in the area of the forward lateral frame part 11 disposed above one another, a common connecting web 40 is provided which is connected approximately at a right angle on the exterior wall section 16 forming the shell of the vehicle body.

The upwardly projecting nose-shaped partial area 18 of the wall section 16 extends adjacent to the radius-shaped transition area 36 of the holding strip 29, which partial area 18 of the wall section 16, together with the exterior folding top covering 10, forms the rain groove 19. The folding top covering 10 is offset laterally to the interior with respect to the nose-shaped partial area 18. The nose-shaped partial area 18 is connected to the common connecting web 40.

In the area of the B-column 21, the edge area 41 of the folding top covering 10 projects, without being fixed, into a receiving device 42 provided on the B-column 21 and interacts in a supporting manner with another sealing strip 43 arranged at the receiving device 42.

Figure 3:
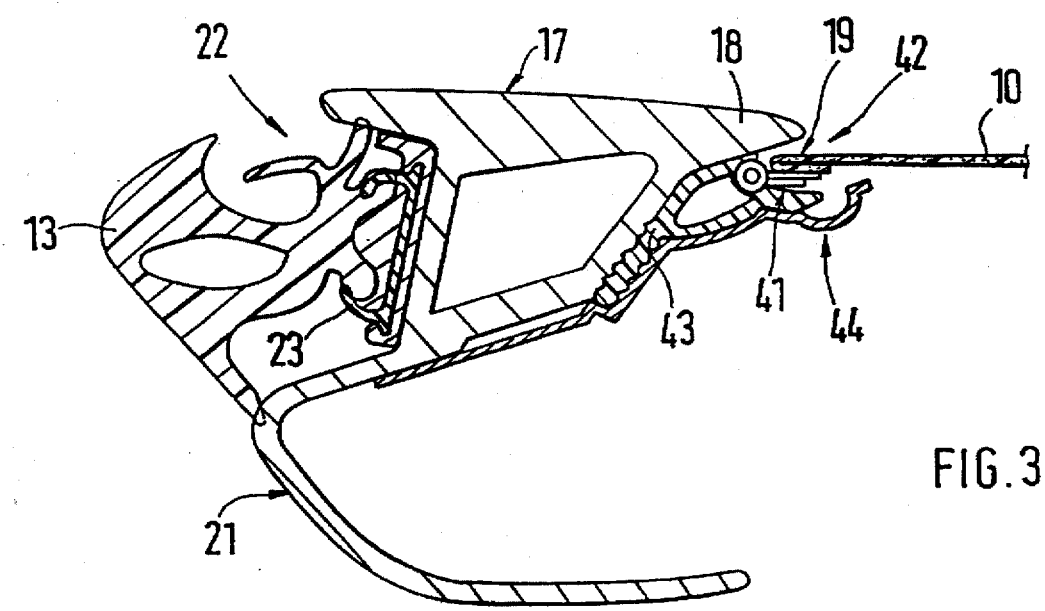
FIG. 3 is an enlarged sectional view taken along Line III—III of FIG. 1.

The receiving device 42 is formed by a partial area of the B-column and a fitted-on locking plate 44 which is connected with the B-column 21 in a locally fixed manner (FIG. 3).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Molding top for passenger cars, composed of a folding top structure, sealing strips and a folding top covering, the folding top covering and sealing strips being held in position on lateral frame parts of the folding top structure, wherein linkages for the folding top covering and for the sealing strips are provided separately from one another on the lateral frame parts of the folding top structure, wherein wall sections of the lateral frame parts of the folding top structure, which are not covered by the folding top cover and which form the vehicle shell in sections, extend between the spaced linkages, wherein a nose-shaped partial area of the wall section forming the vehicle shell which faces the folding top covering is constructed such that, together with the adjoining folding top covering situated farther on the inside, a rain groove is formed, and wherein the wall sections which form the vehicle shells have curved exterior surfaces extending inwardly so as to approximately conform to adjacent folding top covering sections.

2. Folding top according to claim 1, wherein the wall sections of the lateral frame parts which extend between the two linkages form a molding which, starting from a vehicle windshield frame, extends along longitudinal sides of the vehicle continuously to an area situated behind vehicle side doors approximately at the level of a vehicle belt line.

3. Folding top according to claim 2, wherein the width of the molding increases continuously from the windshield frame toward the rear.

4. Folding top according to claim 1, wherein the folding top structure, in the laterally exterior area, comprises a first forward frame part and also a second rearward frame part which are joined in the longitudinal direction and are connected with one another in a hinged manner.

5. Folding top according to claim 4, wherein the forward frame part, which adjoins a vehicle windshield frame, is constructed in one substantially rigid piece with a relatively large-surface, transversely extending forward folding top section.

6. Folding top according to claim 4, wherein the rearward frame part is formed by means of a B-column which is curved in the lateral view, a lower end of the B-column being pivotably disposed on a body-side folding top bearing.

7. Folding top according to claim 4, wherein, on two of said frame parts on a side facing an adjoining vehicle side window, one indented first receiving device or recess respectively is constructed on which the sealing strip is fastened by means of a holding rail.

8. Folding top according to claim 7, wherein the first receiving device has an approximately U-shaped or V-shaped construction, an exterior leg of the receiving device being formed by a partial area of the projecting wall section which faces the side window or by a molding.

9. Folding top according to claim 8, wherein the holding rail, which has an approximately C-shaped profile, or a molding connected with it, rests on a base of the indented receiving device.

10. Folding top according to claim 7, wherein, on the forward lateral frame part on the side facing away from the first receiving device, a second, approximately triangular receiving recess or device is provided on which the folding top covering can be fixed, the second receiving device which follows the projecting wall section being constructed to be open in the direction of the exterior side of the vehicle.

11. Folding top according to claim 10, wherein the folding top covering extends only around a partial area of the forward frame part, and wherein, in the fastening area of the folding top covering, an interior profiled holding strip is provided on which the folding top covering rests, the holding strip being held in position on the frame part by means of fastening screws.

12. Folding top according to claim 1, wherein a first receiving device is provided on said lateral frame parts for receiving said sealing strips, and wherein a profiled holding strip is provided which has a first, elongated, upwardly directed leg which determines the shape of the folding top covering in the laterally exterior area, the first leg resting adjacent to a second receiving device on an adjoining contact surface of a forward folding top section.

13. Folding top according to claim 12, wherein the profiled holding strip comprises a second, inwardly directed leg, the two legs of the holding strip being connected to one another by means of a radius-shaped transition area.

14. Folding top according to claim 13, wherein locally bent-out tongues are constructed on an interior end area of the second leg, which tongues are guided through slot openings of the folding top covering, individual longer tongues being bendable into a holding position.

15. Folding top according to claim 10, wherein, between the receiving devices in the area of the forward lateral frame part, which are disposed above one another, a common connecting web is provided which is connected approximately at a right angle to the exterior wall section forming the shell of the vehicle body.

16. Folding top according to claim 15, wherein the upwardly projecting nose-shaped partial area adjacent to the radius-shaped transition area of the holding strip is connected to the common connection area, the nose-shaped partial area and the folding top covering forming the rain groove.

17. Folding top according to claim 9, wherein local recesses are provided at the base of the C-profiled holding rail in the area of the fastening screws for the folding top covering.

18. Folding top according to claim 1, wherein, in an area of the B-column, the edge area of the folding top covering, without being fastened, projects into a receiving device provided on the B-column and interacts there with another sealing strip in a supporting manner.

19. Folding top according to claim 18, wherein the receiving device is formed by a partial area of the B-column and a fitted-on locking plate, the locking plate being locally fixedly connected with the B-column.

20. Folding top according to claim 5, wherein the rearward frame part is formed by means of a B-column which is curved in the lateral view; a lower end of the B-column being pivotably disposed on a body-side folding top bearing.

21. Folding top according to claim 20, wherein, on the two frame parts on the side facing an adjoining vehicle side window, one indented first receiving device or recess respectively is constructed on which the sealing strip is fastened by means of a holding rail.

22. Folding top according to claim 21, wherein the first receiving device has an approximately U-shaped or V-shaped construction, an exterior leg of the receiving device being formed by a partial area of the projecting wall section which faces the side window or by a molding.

23. Folding top according to claim 22, wherein a holding rail, which has an approximately C shaped profile, or a molding connected with it, rests on a base of the indented receiving device and can be fixed by means of fastening screws.

24. Folding top according to claim 4, wherein an approximately triangular shaped recess or receiving device is provided on the forward lateral frame part for accommodating attachment of the folding top covering.

25. Folding top according to claim 24, wherein the folding top covering extends only around a partial area of the forward frame part, and wherein, in the fastening area of the folding top covering, an interior profiled holding strip is provided on which the folding top covering rests, the holding strip being held in position on the frame part by means of fastening screws.

26. Folding top according to claim 25, wherein the profiled holding strip has a first, elongated, upwardly directed leg which determines the shape of the folding top covering in the laterally exterior area, the first leg resting adjacent to the receiving device on an adjoining contact surface of the forward folding top section.

27. Folding top according to claim 1, wherein the linkages for the folding top covering and for the sealing strip are configured to fixedly hold the folding top cover covering and sealing strip at respective oppositely facing sides of a web of a forward one of the lateral frame parts.

\* \* \* \* \*